United States Patent
Hoffman et al.

[15] 3,672,605
[45] June 27, 1972

[54] SYSTEM FOR DEPLOYMENT OF A SPHERICAL BODY FROM THE NOSE OF AN ACCELERATING BALLISTIC VEHICLE

[72] Inventors: Leonard M. Hoffman, Burlingame; John B. Kimball, Menlo Park, both of Calif.

[73] Assignee: The United States of America as represented by the Secretary of the Navy

[22] Filed: Feb. 16, 1971

[21] Appl. No.: 115,450

[52] U.S. Cl. ............................................................244/1 SS
[51] Int. Cl. .....................................................B64g 1/10
[58] Field of Search .................................................244/1 SS

[56] References Cited

UNITED STATES PATENTS 3,380,687   4/1968   Wrench et al. .....................244/1 SS
3,424,403   1/1969   Hull......................................244/1 SS
3,433,436   3/1969   Mattey..................................244/1 SS

*Primary Examiner*—Andrew H. Farrell
*Attorney*—R. S. Sciascia and Charles D. B. Curry

[57] ABSTRACT

A system for lateral deployment of a spherical body from an accelerating ballistic vehicle. The smooth spherical body is constrained during the launch by a visor-like nose fairing, a ramp and a retractable chock, all located in the apex of the vehicle. Prior to separation, the nose fairing opens and the ramp is extended. At attainment of the desired separation velocity, the chock is retracted permitting the sphere to roll down the ramp under the thrust of the ballistic vehicle. During the roll down the ramp the sphere picks up spin velocity, normal to its roll axis, as required for re-entry temperature control. Lateral reaction of the vehicle resulting from the separation of the spherical body from the vehicle is counteracted by rocket motors deployed in the vehicle.

10 Claims, 3 Drawing Figures

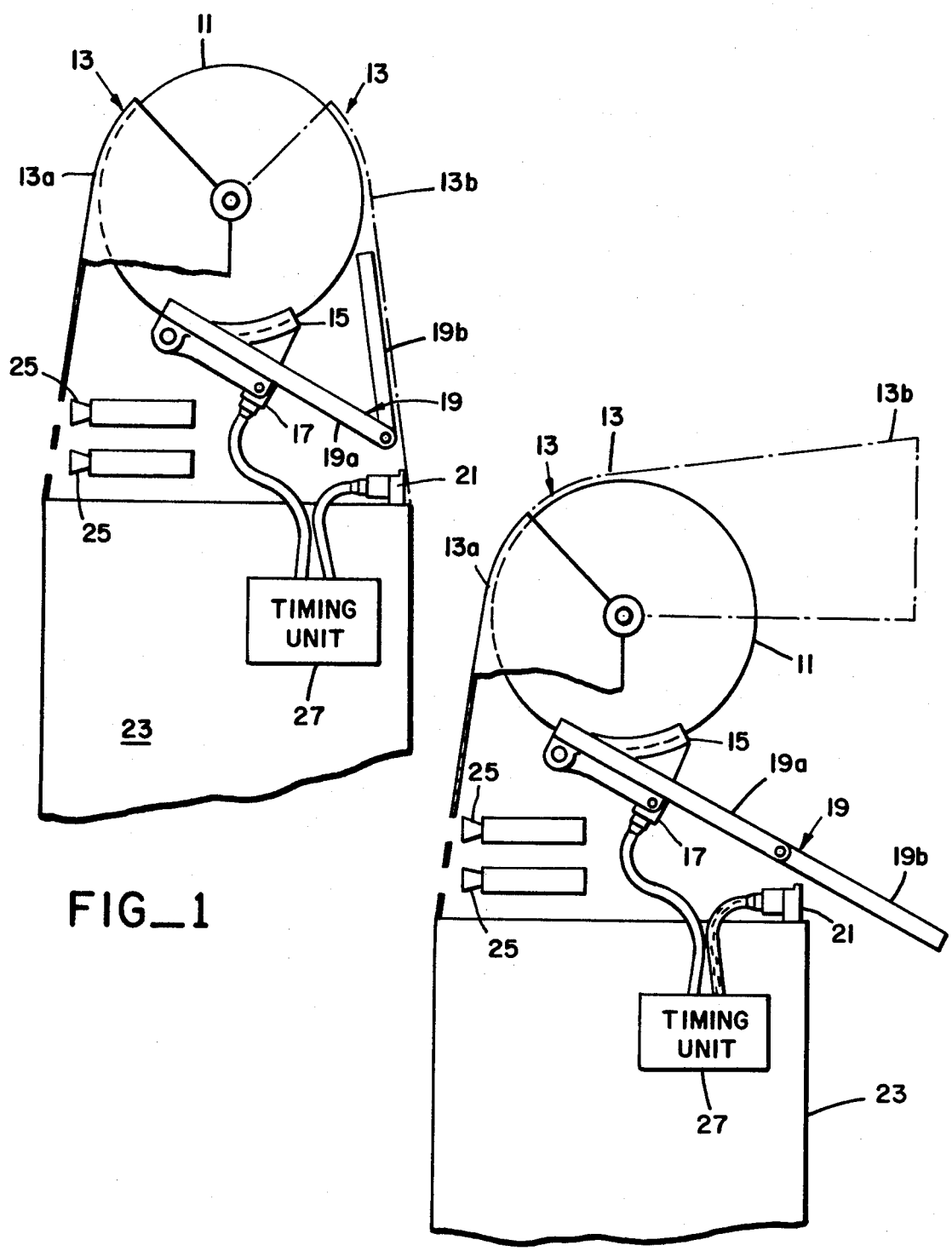

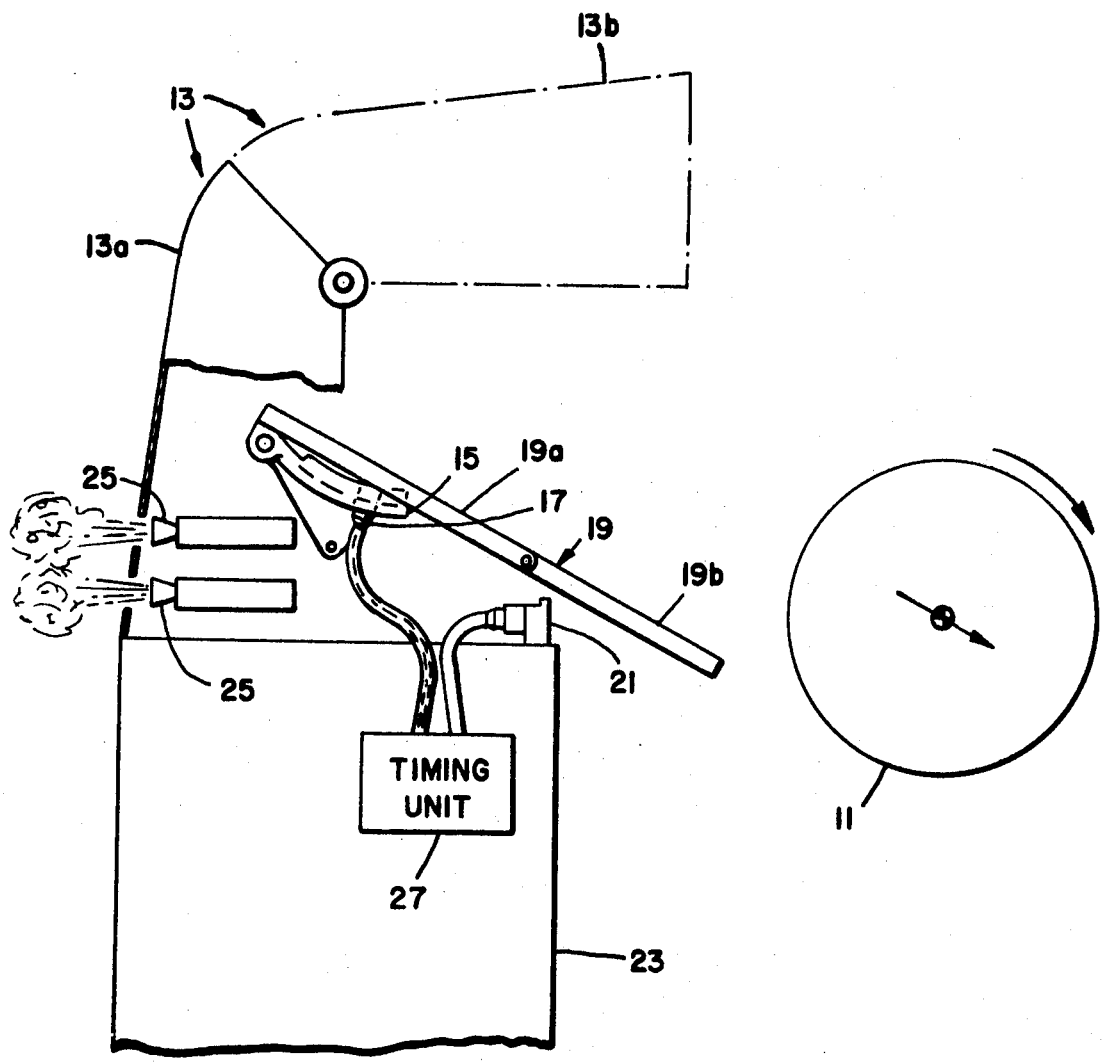
FIG_3

SYSTEM FOR DEPLOYMENT OF A SPHERICAL BODY FROM THE NOSE OF AN ACCELERATING BALLISTIC VEHICLE

The invention described herein may be manufactured and used by or for the Government of the United States of America for governmental purposes without the payment of any royalties thereon or therefor.

BACKGROUND OF INVENTION

The present invention relates generally to the lateral deployment of a sphere from a ballistic vehicle and more particularly to deploying a smooth spherical body at a precise velocity, spin rate, and direction in a predictable position in space relative to an accelerating booster rocket.

The prior systems for deploying spherical bodies from ballistic vehicles placed the vehicle in a prespinning condition with the deployment device releasing the sphere in such a manner as to cause the spherical body to move away from the vehicle by centrifugal force. The speed of movement corresponds to the rate of spin speed of the vehicle. However, these systems do not have sufficient control over the spin rate of the spherical body deployed to obtain the proper stability. If the spin rate is too slow, then the spherical body may become unstable in its orbit. If the spin rate is too fast, then the structural strength of the spherical body has to be increased, thus increasing weight of the spherical body.

Moreover, if the spherical body is to be deployed at a very rapid rate of rotation, the carrier vehicle must be rotated at the same speed. This would require the carrier vehicle to have considerable strength. The present invention will overcome the problems caused by the inacurate spin velocities. In addition, the present device provides a means for ejecting and rotating a spherical body at a precise lateral translational velocity and with a predictable spin velocity around an axis oriented parallel to the ground plane. Furthermore, the spherical body is so guided as to prevent its collision with the parent vehicle. Deployment is carried out passively by means of existing vehicle accelerations and simple light-weight mechanical components.

It is therefore an object of the present invention to provide a system for precise spinning and deploying of a spherical body from the nose of an accelerating ballistic vehicle.

Another object of the present invention is to provide a means of deployment of a spherical body from a parent vehicle by means of existing vehicle accelerations and simple light-in-weight mechanical components.

Other objects, advantages, and novel features of the invention will become apparent from the following detailed description of the invention when considered in conjunction with the accompanying drawings wherein:

FIG. 1 is a plan view illustrating the spherical body deployment system in the initial state at launch or the stowed position;

FIG. 2 is a plan view illustrating the spherical body deployment system with the visor-like nose fairing and ramp extended; and FIG. 3 is a plan view illustrating the spherical body deployment system in the spherical body ejection separation stage and rocket motor ignition.

FIG. 1, 2, and 3 depict a sequence in which spherical body 11 is laterally deployed at a precise velocity spin rate and direction. The velocity and time of release can be varied for placing the spinning spherical body in a predictable position in space relative to the booster rocket. The ramp length and angle insures that the deployed spherical body does not collide with the accelerating booster vehicle in all vehicle attitudes. Referring to FIG. 1, the spherical body 11, which may weigh about 454 lb., is stowed in the apex portion of nose fairing 13 on the forward section of the second stage 23 of a ballistic vehicle. Spherical body 11 may be made of beryllium or other comparable metals.

The deployment system comprises a fixed nose fairing 13a, visor-like nose fairing 13b, retractable chock 15, pin puller 17, retractable ramp 19, shroud ramp extender initiator 21, and rocket motors 25. Retracting ramp 19 consists of two sections, fixed ramp 19a and retractable ramp extension 19b. The rocket motor propulsion units 25 counteract the separation reaction of sphere 11. Spherical body 11 is constrained by visor-like nose fairing 13b, retractable ramp extender 19b and retractable chock 15.

Referring to FIG. 2, prior to separation visor nose fairing 13b is actuated hydraulically by shroud ramp extender initiator 21 through a mechanical linkage system, not shown. During the same actuation sequence, the shroud ramp extender initiator 21 actuates ramp extender 19b through a mechanical linkage system, not shown.

Referring to FIG. 3, at attainment of the desired separation velocity pin puller 17 activates chock 15. Chock 15 is then retracted permitting sphere 11 to roll off ramp 19. Ramp extension 19b is inclined approximately 30° to the null vector; 60° to the roll axis of second stage 23. The acceleration of second stage 23 is used to impart the required translational and rotational velocity to spherical body 11. During the roll down ramp 19, sphere 11 picks up spin velocity normal to its roll axis as required for re-entry temperature control. Rocket motors 27, with burning times of approximately 0.2 sec., for example, and suitable specific impulses, are ignited to counteract the side thrust on second stage 23 due to the reaction of spherical body 11 against ramp 19 as it rolls down ramp 19.

Referring to FIG. 1, the actuation of pin puller 17 and shroud ramp extender initiator 21, in the proper sequence or timing interval, is accomplished by timing unit 27. Timing unit 27 may be preset to the appropriate separation time desired. The desired separation velocity is a function of time and is controlled by the preselected separation time set in timing unit 27.

Referring to FIG. 2, at a preselected time prior to the separation velocity, timing unit 27 is actuated thus actuating shroud ramp extender initiator 21 and thereby raising visor-like nose fairing 13b and extending retractable ramp section 19b of ramp 19.

Referring again to FIG. 3, at the desired separation velocity timing unit 27 sends a signal to pin puller 17, thus actuating pin puller 17. Pin puller 17 activates chock 15, causing chock 15 to retract, thus permitting spherical body 11 to roll down ramp 19. It should be noted that the timing sequence for actuating the visor-like nose fairing 13b, retractable ramp 19, and chock 17 may be accomplished by use of a clock timer or a hydraulic dash-pot timer. The hydraulic dash-pot type timer could be used interchangeably with the clock timer.

The particular operational details of pin puller 17, shroud ramp extender initiator 21 and the mechanical linkage system associated therewith, and timing unit 27 are not considered part of the present invention and can be constructed in many different ways. For example, shroud ramp extender initiator 21 can be operatively connected to visor-like nose fairing 13b and retractable ramp 19b through mechanical linkages which could be actuated hydraulically by the shroud ramp extender initiator 21. Moreover, the timing device 27, which actuates the appropriate units in sequence, are standard timer systems used in the art.

It has been found that the following lateral velocities ($v$) and rotational rates ($n$) can be expected:

| | | |
|---|---|---|
| 900 nm | $v = 24.4$ ft/sec | $n = 4.0$ RPS |
| 1500 nm | $v = 17.0$ ft/sec | $n = 3.2$ RPS |

These figures are based on a fixed ramp length of 2 ¾ ft and a 1 ft. ramp extension.

The spherical body will preferably accelerate for approximately 0.2 to 0.25 sec. during which time the rocket motors will burn approximately 0.18 sec. During this period the second stage motors compensate for minor differences in the attitude of the second stage rocket. The specific impulse due to lateral thrust by the sphere is about 350 lb. sec. and 240 lb. sec. for 900 nm and 1,500 nm trajectories, respectively.

What is claimed is:

1. A device for deploying a spherical body from the nose section of an accellerating ballistic vehicle, said deploying device comprising:
   a. spherical body stowing means for retaining said spherical body;
   b. movable nose fairing movably attached to said fixed nose fairing;
   c. movable spherical body retaining means for further retaining said sphere in said nose section; and
   d. a means for counteracting lateral reaction resulting from deployment of said spherical body from said nose section.

2. The device in claim 1 further including a fixed nose fairing operatively connected to said movable nose fairing and attached to said ballistic vehicle.

3. The device recited in claim 2 wherein the movable nose fairing is a visor-like nose fairing.

4. The device recited in claim 1 wherein the spherical body stowing means is a retractable chock.

5. The device recited in claim 1 wherein said retractable chock is actuated by a pin puller means.

6. The device recited in claim 1 wherein said movable spherical body retaining means is a retractable ramp.

7. The device recited in claim 6 wherein the retractable ramp is retracted by a ramp extender initiator.

8. The device recited in claim 1 wherein said counteracting means are rockets.

9. The device recited in claim 8 wherein the rockets are actuated at separation velocity of the ballistic vehicle.

10. The device recited in claim 1 wherein said movable nose fairing and said movable spherical body retaining means are actuated prior to obtaining separation velocity of said vehicle, wherein said stowing means is retracted at the separation velocity of said vehicle.

* * * * *